United States Patent [19]

Smith et al.

[11] Patent Number: 5,034,547

[45] Date of Patent: Jul. 23, 1991

[54] ANTHRAQUINONE DYES HAVING ALKYLSULFONYLAMINO SUBSTITUENTS

[75] Inventors: Terrance P. Smith, Woodbury; Krzysztof A. Zaklika, St. Paul, both of Minn.

[73] Assignee: Minnesota Mining and Manufacturing Company, St. Paul, Minn.

[21] Appl. No.: 384,157

[22] Filed: Jul. 21, 1989

[51] Int. Cl.$^5$ ..................... C07C 97/24; C07C 143/38
[52] U.S. Cl. ...................... 552/235; 552/243; 552/248; 552/253; 552/254
[58] Field of Search ............. 552/253, 254, 248, 250, 552/251, 252, 235, 243

[56] References Cited

U.S. PATENT DOCUMENTS

| | | | |
|---|---|---|---|
| 3,484,342 | 8/1966 | Blake et al. | 204/18 |
| 3,617,173 | 11/1971 | Hilldreth et al. | 8/39 |
| 4,201,821 | 5/1980 | Fromson et al. | 428/203 |
| 4,369,038 | 1/1983 | Mehl | 8/471 |
| 4,682,983 | 7/1987 | Mehl | 8/468 |
| 4,808,568 | 2/1989 | Gregory et al. | 503/227 |

FOREIGN PATENT DOCUMENTS

| | | | |
|---|---|---|---|
| 5337942 | 11/1973 | Japan . | |
| 51-40197 | 2/1975 | Japan . | |
| 0048601 | 1/1986 | Japan | 552/253 |
| 1424203 | 2/1976 | United Kingdom . | |

OTHER PUBLICATIONS

*Chemistry in Britain*, "Electronic Photography—The Future", Peter Gregory, Jan. 1989, pp. 47-50.
*Chemical Processing of Synthetic Fibers and Blends*, K. V. Datye and A. A. Vaidya, 1984, John Wiley and Sons, Chapter 15, Transfer Printing, pp. 396-416.

*Primary Examiner*—C. Warren Ivy
*Assistant Examiner*—Raymond Covington
*Attorney, Agent, or Firm*—Gary L. Griswold; Walter N. Kirn; Mark A. Litman

[57] ABSTRACT

New anthraquinone dyes, free of water-solubilizing groups such as —SO$_3$H and —CO$_2$H comprise anthraquinone substituted with one or more identical or different groups of the formula —NHSO$_2$R, wherein R is a substituted or unsubstituted linear, branched, cyclic or polycyclic alkyl group having up to 20 carbon atoms, and wherein the remaining nuclear aromatic carbon atoms of the anthraquinone may be substituted with substituents selected from the group: alkyl; the halogens F, Cl, and Br; cyano; nitro; aminosulfonyl; arylsulfonylamino; and —NHCOQ; wherein Q is hydrogen, an alkyl, an aryl, or a heterocyclic group.

These dyes have improved solubility, lowered melting point, and possess outstanding resistance to light-induced fading.

13 Claims, No Drawings

ANTHRAQUINONE DYES HAVING ALKYLSULFONYLAMINO SUBSTITUENTS

CROSS-REFERENCE TO RELATED CASES

Some of the dyes included in the claims of the present case are included in examples of eutectic combinations of dyes for thermal imaging in 3M patent application Ser. No. 193,947 filed on May 13, 1988.

BACKGROUND TO THE INVENTION

1. Field of Invention

This invention relates to coloring materials and, more particularly, to dyes of the anthraquinone class having alkylsulfonylamino substituents.

In the practice of the present invention, the term "sulfonylamino" is used to identify that the substituent is uniquely bonded to the ring through the nitrogen atom, i.e., $RSO_2NH$—. Although chemical nomenclature is clear on the point, the term "sulfonamido" is used in the literature to mean a substituent bonded either through the nitrogen (correct) or through the sulfur atom (incorrect) thus creating confusion. Similarly we have used the term "carbonylamino" to clarify the position with the carboxylic acid equivalents bonded through the nitrogen atom.

2. BACKGROUND OF THE ART

While many yellow, orange and red anthraquinone dyes are available, for example acylamino-substituted anthraquinones, there remains a need for improving properties other than purely optical and color considerations such as hue. The successful application of dyes to a variety of processes requires tailoring of properties other than color to the needs of the application. For example, for outdoor signs good weathering resistance of the dyes used is a prerequisite. In the production of colored coatings on objects, solubility of the dye in the coating medium is a key characteristic. For dyes incorporated in liquid crystal devices, a high order parameter is desirable. In thermal dye transfer imaging applications control of dye melting point is crucial to effective image formation. In fluorescent inks, the emission wavelength of the dye in relation to its absorption wavelength is an important criterion.

Anthraquinone dyes with acylamino substituents, free of auxochromic groups such as amino, alkoxy and alkylthio, are well known in the art. Acylamino groups of the alkylcarbonylamino and arylcarbonylamino variety are known, the latter in particular being common (e.g., CI 60520, CI 61650, CI 61725).

Anthraquinones substituted solely with arylsulfonylamino groups have also been reported. These are described, for instance, in: F. Ullmann, Ber., 43, 536 (1910); H. Kauffmann and H. Burckhardt, Ber., 46, 3808 (1913); F. Ullmann and G. Billig, Ann., 381, 11 (1911); R. Scholl et al., Ber., 62, 107 (1929); K. Naiki, J. Soc. Org. Synth. Chem. Japan, 13, 72 (1955); and in German Pat. No. 224,982 and U.S. Pat. Nos. 3,274,173 and 3,240,551. These are, in general, high melting, poorly soluble, rather intractable materials.

Anthraquinones have also been described in which arylsulfonylamino and arylcarbonylamino groups are simultaneously present. Such materials may be found in the aforementioned U.S. Pat. No. 3,240,551, in U.S. Pat. Nos. 1,939,218 and 1,966,125, and in German Pat. Nos. 623,069 and 647,406.

In view of the fact that anthraquinones substituted with alkylcarbonylamino groups have been known for over 100 years (see e.g., H. Roemer, Ber., 15, 1786 (1882)), it is surprising that the first simple alkylsulfonylaminoanthraquinone was reported only in 1986 in Japanese Kokai JP61-10549. That patent application claims, among other materials, anthraquinones bearing a single lower alkyl- or lower haloalkylsulfonylamino substituent, with an additional substituent in each outer ring selected from hydrogen, lower alkyl, lower haloalkyl or halogen. They are described as useful for their anti-inflammatory, antipyretic, analgesic and diuretic activity. These materials are stated to be prepared by reaction of an aminoanthraquinone with an alkanesulfonyl chloride in the presence of pyridine, as is known in the art. All the concrete examples of this patent involve either the methylsulfonylamino or the trifluoromethylsulfonylamino substituent. We have been able to prepare these same derivatives in good yield by the stated method. However, in work on the present invention, all attempts to prepare alkylsulfonylamino derivatives containing two or more carbon atoms by said method were, surprisingly, unsuccessful. This observation may be related to the intervention of sulfene intermediates in these types of reaction. (See, for example J. F. King, Acc. Chem. Res., 8, 10 (1975)). Whatever the cause, we have been able to prepare mono- and poly-alkylsulfonylamino derivatives with two or more carbon atoms only by other methods described in detail below, thus providing the first access to this class of materials. Additional art pertinent to these materials is U.S. Pat. No. 4,062,875, which describes a process comprising treating a 2-acylamino-2'-carboxydiphenylmethane with an acid condensing agent, whereby there is formed the corresponding 4-acylaminoanthrone, which may be oxidized to the corresponding anthraquinone. The patent does not, however, disclose any example of the process operated with an acyl radical derived from a sulfonic acid. U.S. Pat. No. 3,558,698 concerning N-substituted perfluoroalkanesulfonamides claims anthraquinonyl derivatives, among others. The example of 2-trifluoromethylsulfonylaminoanthraquinone is provided. This material is not a dye. In U.S. Pat. No. 3,278,549 there are disclosed water-soluble reactive dyes, exhibiting good wash fastness on cellulose and protein fibers, characterized by the presence of a 1,2,2-trifluorocyclobutyl group, optionally containing additional substituents. This group may be attached to a variety of dyes, including anthraquinone dyestuffs, by a range of amide links among which are —$NHSO_2$— and —$NHSO_2CH_2CH_2$— linkages. All the examples of anthraquinone dyes contain at least two —$SO_3H$ groups, and contain the 1-amino and 4-anilino auxochromic groups. In the single instance of a —$NHSO_2$— link this group is not attached to the anthraquinone nucleus, and the dye is blue.

U.S. Pat. No. 3,617,173 claims polyester fibers dyed with 2-aroylanthraquinones having various amino substituents in the 1- and 4-positions. The possibility of simultaneously included 1-arylsulfonylamino and 4-alkylsulfonylamino substituents appears to be considered, but no examples are provided of such materials. This is not surprising in view of the steric hindrance towards introduction of large 1-substituents presented by the 2-aroyl group. Indeed, all the samples in this patent contain either a simple amino or a methylamino group in the 1-position, reflecting the difficulty of synthesis of the above materials.

Although thermal printing of textiles bears a superficial resemblance to diffusive thermal dye imaging, in reality quite different processes with distinct properties and material requirements are involved. Thermal printing occurs by a sublimation process, so that substantial vapor pressure is a prime criterion for dye selection. In diffusive dye imaging, high vapor pressure of the dye contributes to undesirable thermal fugacity of the image. For the melt state diffusion process involved in this situation, melting point is instead a better basis for dye selection. Diffusive dye transfer is a high resolution dry imaging process in which dye from a uniform donor sheet is transferred in an imagewise fashion by differential heating to a very smooth receptor, using heated areas typically of 0.0001 square inches or less. In contrast, the thermal printing of textiles is of comparatively low resolution, involving contemporaneous transfer by uniform heating of dye from a patterned, shaped or masked donor sheet over areas of tens of square feet. The typical receptors printed in this manner are woven or knitted fabrics and carpets. The distinct transfer mechanism allows such rough substrates to be used, while diffusive imaging, where receptors with a mean surface roughness of less than 10 microns are used, is unsuitable for these materials. Unlike diffusive thermal dye imaging, the transfer printing process is not always a dry process; some fabrics or dyes require pre-swelling of the receptor with a solvent or a steam post-treatment for dye fixation. Though the transfer temperatures for the two processes can be similar (180° to 220° C.), diffusive dye transfer generally operates at somewhat higher temperatures. However, in a manner strikingly reflective of the differences in mechanism involved, diffusive dye transfer involves times of around 5 msec, whereas thermal printing normally requires times of 15 to 60 sec. In accord with the sublimation process involved, thermal printing often benefits from reduced atmospheric pressure or from flow of heated gas through the donor sheet. Thermal printing is a technology developed for coloring of textiles and is used to apply uniformly colored areas of a predetermined pattern to rough substrates. In contradistinction, diffusive dye transfer is a technology intended for high quality imaging, typically from electronic sources. Here, a broad color gamut is built with multiple images from donors of the three primary colors onto a smooth receptor. The different transfer mechanism allows the requirement for grey scale capability to be fulfilled, since the amount of dye transferred is proportional to the heat energy applied. In thermal printing grey scale capability is expressly shunned, because sensitivity of transfer to temperature decreases process latitude and dyeing reproducibility.

When auxochromic groups such as alkylthio, alkoxy, amino and substituted amino are introduced into the anthraquinone nucleus along with alkyl- or arylsulfonylamino groups, the resulting dyes are generally red, violet, or blue. Many examples of these dyes are known in the art. Typically, both aryl- and alkylsulfonylamino derivatives are claimed in the same patent, without any differentiation in properties. Examples of such materials are contained in U.S. Pat. Nos. 2,640,059, 3,394,133, and 3,894,060, wherein a single sulfonylamino substituent is present, and in U.S. Pat. No. 3,209,016 and Japanese Kokai 63-258955, wherein two sulfonylamino groups may be present. In other instances, alkyl- and arylsulfonylaminoanthraquinones of otherwise identical structure are claimed in separate patents, again with no distinction between the properties of the two classes. Thus, U.S. Pat. No. 1,948,183 claims 1-amino-2-alkoxy-4-arylsulfonylaminoanthraquinones, while U.S. Pat. No. 3,072,683 claims 1-amino-2-alkoxy-4-alkylsulfonylaminoanthraquinones.

As was stated previously, arylsulfonylaminoanthraquinones without auxochromic groups are rather intractable materials. In contrast, the new yellow, orange and red alkylsulfonylaminoanthraquinones of this invention are more valuable dyes by virtue of their increased solubility in non-aqueous solvents and reduced melting points, which render them more useful for a variety of applications. Despite the absence of the arylamide groups usually associated with good fading resistance, these dyes provide excellent photostability.

SUMMARY OF THE INVENTION

New yellow, orange, and red dyes of the anthraquinone class with improved solubility in non-aqueous solvents and reduced melting points are described.

These dyes have excellent fade resistance and unusual fluorescence properties.

The anthraquinone dyes of the present invention may be represented in one sense by the general formula

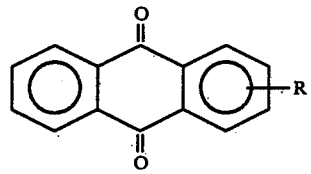

wherein R is an alkylsulfonylamino group

wherein where R' is an alkyl group other than methyl and halogenated methyl and all other substituents on the central nucleus are not auxochromic groups as defined herein. When or if there are more than two R groups, R' may be methyl.

The anthraquinone dyes in another sense of the present invention may be in part described as free of water-solubilizing groups, and have the general structure:

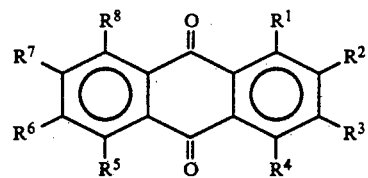

wherein $R^1$ to $R^8$ are chosen independently from the group hydrogen, alkyl, F, Cl, Br, cyano, nitro, aminosulfonyl, arylsulfonylamino, —NHCOR$^9$ group, and —NHSO$_2$R group, providing that at least one of $R^1$ to $R^8$ is an —NHSO$_2$R group, and wherein groups R are selected independently from linear, branched, cyclic or polycyclic alkyl groups having from 1 to 20 carbon atoms, said groups R, for example, being unsubstituted or independently substituted with up to 6 groups $R^{10}$ selected independently from aryl, substituted aryl, heteroaryl, substituted heteroaryl, F, Cl, Br, alkoxy, aryloxy, alkylthio, arylthio, substituted amino, carbonyl (i.e., keto, aldehyde, oxycarbonyl group), carbonylamino, sulfonyl, sulfonylamino and cyano; and wherein $R^9$ is hydrogen, or is selected from alkyl group, aryl group, or a heterocyclic group, optionally substituted with up to 6 groups selected from said $R^{10}$, provided that when only one of $R^1$ to $R^8$ is $-NHSO_2R$ and additionally R has a carbon atom alpha to the sulfonyl group capable of taking one or more substituents $R^{11}$, then $R^{11}$ is selected independently from hydrogen, aryl, substituted aryl, heteroaryl, substituted heteroaryl, alkoxy, aryloxy, alkylthio, arylthio, substituted amino, carbonyl, carbonylamino, sulfonyl, sulfonylamino and cyano.

The compounds of this invention provide dyes of improved solubility in non-aqueous solvents and lowered, controllable, melting point, which possess outstanding resistance to light-induced fading. Some of the compounds also exhibit fluorescence characterized by an exceptionally large Stokes shift.

The compounds of this invention are useful as colorants and in image-forming. They are particularly useful as dyes for thermal image transfer either separately or in combination with other dyes.

DETAILED DESCRIPTION OF THE INVENTION

There are a number of alternative ways of defining the dyes of the present invention so that they exclude all dyes of the prior art. The dyes may be defined in one sense as dyes having a central nucleus of the formulae

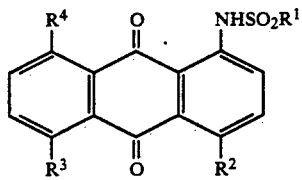

wherein $R^1$ is an alkyl group comprising two or more carbon atoms, and does not have a halogen substituent on the carbon alpha to the sulfur atom; $R^2$–$R^4$ may be any group other than auxochromic groups. Auxochromic groups are undesirable in cases where yellow, orange, or red dyes are desired. The term auxochromic as used herein is defined as RS—, RO—, and $R_2N$— groups where R may be an alkyl or aryl group, or hydrogen. The central nucleus is preferably free of any other auxochromic groups other than additional alkylsulfonylamino groups, arylsulfonylamino groups, alkylcarbonylamino groups, and arylcarbonylamino groups.

The dyes may also be described in a more general sense as dyes having a central nucleus of the formula

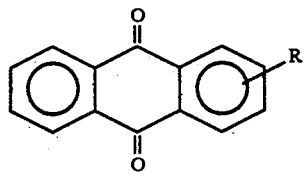

wherein R is an alkylsulfonylamino group

wherein where R' is an alkyl group other than methyl and halogenated methyl and all other substituents on the central nucleus are not auxochromic groups as defined herein. When or if there are more than two R groups, R' may be methyl.

The novel dyes of this invention are free from water-solubilizing groups such as $-SO_3H$ and $-CO_2H$, and their central structure comprises anthraquinone, the nuclear aromatic carbon atoms of which are substituted with x groups of the formula $-NHSO_2R$, x being an integer in the range 1 to 8, inclusive, wherein R is a linear, branched, cyclic, or polycyclic alkyl group having from y to 20 carbon atoms, inclusive, said groups R being unsubstituted or substituted with up to 6 groups $R^{10}$ selected from aryl and substituted aryl, heteroaryl and substituted heteroaryl, the halogens F, Cl, and Br, alkoxy, aryloxy, alkylthio, arylthio, substituted amino, carbonyl, carbonylamino, sulfonyl, sulfonylamino and cyano, and wherein the remaining nuclear aromatic carbon atoms of the anthraquinone are additionally substituted with z identical or different substituents from the group alkyl, F, Cl, Br, cyano, nitro, aminosulfonyl, arylsulfonylamino, and $-NHCOR^9$, but excluding certain oxy, thio, and amino linked substituents, namely the substituents $-OR^9$, $-SR^9$, $-NHR^9$, $-NR^9$, wherein $R^9$ is selected from hydrogen; and alkyl, aryl, and heterocyclic group which may be substituted with up to 6 groups $R^{10}$; and z is in the range 0 to 8-x, and y is 1, with the proviso that, when x is 1, y is 2 and R is not halogen-substituted alpha to the sulfonyl group.

Alkylsulfonylamino groups may be placed in the alpha or beta positions of the anthraquinone. The preferred position is alpha; thus 1-substituted, 1,4-bissubstituted, 1,5-bissubstituted, 1,8-bissubstituted, 1,4,5-trissubstituted and 1,4,5,8-tetrakissubstituted alkylsulfonylamino-anthraquinones are preferred. Of these, the 1-, 1,4-bis-, 1,8-bis- and 1,4,5-tris(alkylsulfonylamino) derivatives are particularly preferred.

The alkyl groups in the alkylsulfonylamino moiety may contain from 1 to 20 carbon atoms, or from 2 to 20 carbon atoms in the case of mono-substitution. Preferably there are at least 3 carbon atoms. A most preferred range is from 6 to 16 carbon atoms. A great variety of alkyl and substituted alkyl groups may beneficially be used. Among alkyl groups there may be mentioned such groups as ethyl, and the isomers of propyl, butyl, amyl, hexyl, heptyl, octyl, decyl, lauryl, myristyl, palmityl and stearyl. Among cyclic alkyl groups there may be mentioned cyclobutyl, cyclopentyl, cyclohexyl, and cycloheptyl. Cyclohexyl is particularly preferred. Mention may also be made of other groups such as hydrindanyl, decalinyl, or alkyl groups derived from bicyclic systems, such as bicyclo[2.2.1]heptane and its alkylated derivatives, and bicyclo[2.2.2]octane and adamantane. In this case, it is preferred that there be an alkylene bridge between the cyclic system and the sulfonyl group. Of the various alkyl groups, linear and branched alkyl groups are especially preferred. A wide variety of substituent groups may be additionally present in the alkyl moiety of the alkylsulfonylamino group. In the case of mono-(alkylsulfonylamino)anthraquinones it is preferred, however, that the alkyl group be free of electron withdrawing groups alpha to the sulfonyl group such as halogen, nitro, sulfonyl, carbonyl and cyano, since these reduce the absorption of the material in the visible region of the electromagnetic spectrum. Suitable representative groups include: aryl and substituted aryl, heteroaryl and substituted heteroaryl, the halogens F, Cl, and Br, alkoxy, aryloxy, alkylthio, arylthio, substituted amino, carbonyl, carbonylamino, sulfonyl, sulfonylamino and cyano.

It is well understood in this technical area, that a large degree of substitution is not only tolerated, but is often advisable. As a means of simplifying the discussion and recitation of these groups, the terms "group" and "moiety" are use to differentiate between chemical species that allow for substitution or which may be substituted. For example, the phrase "alkyl group" is intended to include not only pure hydrocarbon alkyl chains such as methyl, ethyl, pentyl, cyclohexyl, isooctyl, tert-butyl and the like, but also such alkyl chains bearing conventional substituents in the art such as hydroxyl, alkoxy, phenyl, halo (F, Cl, Br), cyano, nitro, amino, etc. The phrase "alkyl moiety", on the other hand, is limited to the inclusion of only pure hydrocarbon alkyl chains such as methyl, ethyl, propyl, cyclohexyl, isooctyl, tert-butyl, and the like.

In addition to the alkylsulfonylamino groups described above the anthraquinone nucleus may be substituted with a variety of non-auxochromic groups, as is known in the art. Typical groups include: alkyl, fluoro, chloro, bromo, cyano, nitro, aminosulfonyl, and acylamino. Of these, halogens and acylamino groups are especially preferred, it being understood that the acyl moiety of the acylamino group may be derived from an optionally substituted alkyl, aryl or heterocyclic carboxylic acid or from an arenesulfonic acid. Anthraquinones containing both alkylsulfonylamino and alkyl- or arylcarbonylamino groups form a particularly preferred class.

The methods of preparation of alkylsulfonylaminoanthraquinones are known generally in the art. For example, U.S. Pat. Nos. 3,072,683 and 3,324,150 describe two procedures: the first involves coupling of a haloanthraquinone with an alkanesulfonamide in the presence of a copper catalyst; the second acylates an aminoanthraquinone with an alkanesulfonyl halide. We have found the latter method to be unsuitable for preparing 1-(alkylsulfonylamino)anthraquinones with two or more carbon atoms in the alkyl chain, but the method may be effective in the case of 1,4-diaminoanthraquinones. The coupling reaction is described in F. Ullmann and G. Billig, *Ann.*, 381, 11 (1911) and the acylation and other related reactions in Houben-Weyl, "Methoden der organische Chemie", 4 Auflage, Band IX, p. 398–400, p. 605–627. Acylating agents other than sulfonyl halides may be used. For example, sulfonic acid anhydrides, both symmetric and unsymmetric, sulfonic acid esters, and quaternary alkanesulfonylammonium salts may be effective. The preferred route to the alkylsulfonylaminoanthraquinones is copper catalyzed coupling of the sulfonamide with a haloanthraquinone.

When substituents additional to alkylsulfonylamino are present in the anthraquinone they may be introduced by conventional procedures well known in the art. These substituents may be present in the molecule prior to introduction of the alkylsulfonylamino groups or may be incorporated when they are already present. Partial hydrolysis of the alkylsulfonylamino groups present, as described in British Pat. No. 445,192 for acylaminoanthraquinones, followed by elaboration of the resultant amino function may also be employed.

EXAMPLES

Examples 1 to 12 describe preparations of representative compounds of this invention containing only alkylsulfonylamino substituents, while Examples 13 to 15 present syntheses of compounds containing other additional substituents. The materials prepared in these examples were characterized by one or more of the following analytical techniques: $^1$H nuclear magnetic resonance, infrared, or ultraviolet-visible spectrometry, melting point. Considerable structural variation is possible within the scope of the invention, and the preparations should be regarded as illustrative but not limiting.

EXAMPLE 1

Preparation of 1-(n-octylsulfonylamino)anthraquinone.

A 100ml round bottom flask, equipped with a magnetic stirrer and cooling condenser, was charged with 1-chloroanthraquinone (2.0g), n-octylsulfonamide (3.0g), copper acetate (0.8g), potassium carbonate (0.8g) and o-dichlorobenzene (25ml). This mixture was slowly heated to reflux. After 2.5 hours the reaction mixture was cooled and filtered. Methanol was then added to induce precipitation, and after filtration the solid was recrystallized from a mixture of dichloromethane and methanol to give a yellow product.

EXAMPLE 2

Preparation of 1,8-bis(benzylsulfonylamino)anthraquinone.

A 100ml round bottom flask, equipped with a magnetic stirrer and cooling condenser, was charged with 1,8-dichloroanthraquinone (1.0g), benzylsulfonamide (4.0g), copper acetate monohydrate (1.0g), potassium carbonate (1.4g) and chlorobenzene (20ml). This mixture was refluxed for 2.0 hours and cooled, whereupon methanol (100ml) was added to induce precipitation. The solid was collected, extracted with dichloromethane, treated with charcoal, and recrystallized from a mixture of methanol and dichloromethane to afford a yellow product.

EXAMPLES 3–12

The compounds tabulated below were prepared by methods similar to to those of Examples 1 and 2, using the appropriate reagents.

Example 3 1-(ethylsulfonylamino)anthraquinone
Example 4 1-(n-propylsulfonylamino)anthraquinone
Example 5 1-(iso-propylsulfonylamino)anthraquinone
Example 6 1-(n-butylsulfonylamino)anthraquinone
Example 7 1-(n-hexadecylsulfonylamino)anthraquinone
Example 8 1-(benzylsulfonylamino)anthraquinone
Example 9 1,5-bis(n-octylsulfonylamino)anthraquinone
Example 10 1,4-bis(n-octylsulfonylamino)anthraquinone
Example 11 1,4,5-tris(n-octylsulfonylamino)anthraquinone
Example 12 1,4,5,8-tetrakis(n-octylsulfonylamino)anthraquinone

EXAMPLE 13

Preparation of 1-n-octylsulfonylamino-5-chloroanthraquinone.

1,5-dichloroanthraquinone (1.0g), n-octanesulfonamide (0.77g), potassium carbonate (1.0g), cupric acetate monohydrate (1.0g) and chlorobenzene (15ml) were refluxed for 4 hours. The solvent was evaporated at reduced pressure and the residue was extracted with toluene. After filtration the extract was separated by chromatography on silica using toluene as eluent to give the desired product as the second fraction.

EXAMPLE 14

Preparation of
1-n-octylsulfonylamino-8-(1'-ethylhexanoylamino)anthraquinone 1-(n-octylsulfonylamino)-8-aminoanthraquinone was prepared as follows. 1-amino-8-chloroanthraquinone (1.0g), n-octanesulfonamide (1.0g), potassium carbonate (1.0g), cupric acetate monohydrate (0.85g) and chlorobenzene (16.0g) were refluxed for 5.5 hours. The cooled mixture was filtered and aqueous methanol was added to the filtrate. The supernatant liquid was decanted and the remaining oil was dissolved in dichloromethane. On addition of methanol and partial evaporation of the solvent, the product separated as a red solid.

1-(n-octylsulfonylamino)-8-aminoanthraquinone (0.25g), 1-ethylhexanoyl chloride (0.5g) and nitrobenzene (5ml) were heated at reflux for 10 mins. After addition of methanol (10ml), the mixture was heated on a steam bath for a further 10 mins to destroy excess acid chloride. On evaporation of low-boiling material, the remaining liquid was diluted with toluene (100ml) and separated by chromatography on a silica gel column. Nitrobenzene eluted first, and the material eluted with a 50:50 mixture of toluene:ethyl acetate was collected. The solvent was evaporated and ethanol was added to the residue, which upon trituration afforded the product as a yellow solid.

EXAMPLE 15

Preparation of
1-n-octylsulfonylamino-8-(4'-tolylsulfonyl)aminoanthraquinone 1-(n-octylsulfonylamino)-8-aminoanthraquinone was prepared as in Example 14. This material (0.30g), 4-toluenesulfonyl chloride (0.30g) and nitrobenzene (3ml) were refluxed for 10 mins. The reaction mixture was diluted with toluene (100ml) and separated by chromatography on silica gel. Evaporation of the yellow fraction eluted with toluene gave the product as a golden solid.

The improved coloring abilities of the dyes of this invention, which result from their enhanced solubility, are described in Examples 16 and 17. Alkyl derivatives of three or more carbon atoms give superior solubilities compared to corresponding aryl derivatives, both in extremely non-polar and in moderately polar solvents.

EXAMPLE 16

Solubility of 1-(alkylsulfonylamino)anthraquinones in n-heptane.

The sulfonylaminoanthraquinones tabulated below were suspended in n-heptane and mechanically shaken. After filtration, the peak absorbances of the supernatant solutions were determined using a 1 cm path length, with the results below.

| 1-Substituent | Absorbance |
| --- | --- |
| 4'-tolyl | 0.15 |
| methyl | 0.10 |
| ethyl | 0.19 |
| n-octyl | 0.74 |

EXAMPLE 17

Solubility of bis(alkylsulfonylamino)anthraquinones in n-butyl acetate.

The sulfonylaminoanthraquinones tabulated below were suspended in n-butyl acetate and mechanically shaken. After filtration, the peak absorbances of the supernatant solutions were determined and corrected to a 1 cm path length, with the results below.

| Substituents | Absorbance |
| --- | --- |
| 1,5-bis(4'-tolyl) | <0.1 |
| 1,5-bis(n-octyl) | 1.4 |
| 1,4-bis(mesityl) | 0.7 |
| 1,4-bis(4'-tolyl) | 4.8 |
| 1,4-bis(n-octyl) | 12.7 |

The reduction in melting points obtained with the alkylsulfonylaminoanthraquinones of this invention is shown in Example 18 by comparison to analogous arylsulfonylamino derivatives. It can be seen that useful reductions in melting point can be achieved with alkyl groups as small as ethyl, and that substitution in the alkyl group can be tolerated without detrimental effect.

EXAMPLE 18

Melting points of dyes

Melting points were determined for the tabulated alkyl- and arylsulfonylaminoanthraquinones by differential scanning calorimetry with a heating rate of 10° C. per minute. Certain of these materials also exhibited thermal transitions other than melting.

| Substituent | Melting point (°C.) |
| --- | --- |
| 1-methyl | 217 |
| 1-ethyl | 191 |
| 1-n-propyl | 168 |
| 1-n-butyl | 140 |
| 1-n-octyl | 135 |
| 1-n-hexadecyl | 131 |
| 1-benzyl | 190 |
| 1-(mesityl) | 249 |
| 1-(4'-tolyl) | 234 |
| 1,4-bis(4'-tolyl) | 248 |
| 1,4-bis(n-octyl) | 178 |

The practical utility of control of melting point in the compounds of this invention is illustrated by application to a thermal dye transfer imaging system in Example 19.

EXAMPLE 19

Thermal transfer

A coating solution was prepared as follows: 1,4-bis(n-octylsulfonylamino)anthraquinone (0.030 gm); Goodrich Temprite TM 678×512 chlorinated polyvinyl chloride (0.025 gm); 60/40 blend of octadecyl acrylate and acrylic acid (0.007 gm); tetrahydrofuran (1.50 gm); 2-butanone (0.10 gm). The solution was coated on 6 micron polyester film using a number 8 wire-wound coating rod and dried in a current of air at ambient temperature. This dye donor sheet was contacted with a Hitachi VY-S Video Print Paper TM receptor sheet and imaged with a Kyocera KMT TM thermal print head. A satisfactory orange image was obtained with good transfer efficiency.

The image formed by thermal transfer in the above Example 19 was evaluated for heat and light stability as described in Example 20. The heat fastness and fade resistance of the image were excellent. As is taught in the art, the presence of the sulfonylamino group may also be expected to confer good sublimation resistance.

EXAMPLE 20

Heat and light stability of the thermal image

The image obtained in Example 19 was exposed in an Atlas UVICON ™ at 350 nm and 50° C. A portion was screened from the light by a thick, opaque, black-film, and was thus subject only to heat. For both light-struck and screened portions of the image the change in (L,a,b) color coordinates, DELTA E, was measured as a function of time, and is tabulated below. A DELTA E of 2.0 or less is not perceptible to the eye.

| Exposure (hours) | DELTA E Heat Only | DELTA E Heat and Light |
|---|---|---|
| 24 | 0.77 | 0.85 |
| 48 | 0.66 | 0.92 |

Anthraquinone dyes are known to exhibit fluorescence to a greater or lesser degree. The peak wavelength of the fluorescence emission is Stokes shifted to the red of the peak absorption wavelength. The amount of this Stokes shift is typically about 3000 to 6000 wavenumbers in aprotic solvents (H. Inoue et al., J. Phys. Chem., 86, 3184 (1982)). It is, therefore, surprising that certain of the compounds of this invention exhibit exceptionally large Stokes shifts in excess of 7000 wavenumbers. Some representative results for anthraquinones substituted solely with alkylsulfonylamino groups are presented in Example 21. The exceptional Stokes shift is seen to be associated with a 1-mono-substitution and with a 1,5- and 1,8-di-substitution pattern. A large Stokes shift can be valuable in the design of radiation sensors and detectors, for example.

EXAMPLE 21

Stokes shifts of alkylsultonylamino-anthraquinones

Absorption and emission spectra of the tabulated compounds were determined in dilute methylene chloride solution. The Stokes shifts were determined from the absorption and emission maxima by difference.

| Substitution Pattern | Stokes Shift (wavenumbers) |
|---|---|
| 1-n-octyl | 9200 |
| 1,4-bis(n-octyl) | 4130 |
| 1,5-bis(n-octyl) | 7500 |
| 1,8-bis(benzyl) | 4530, 7225 (dual emission) |
| 1,3,5-tris(n-octyl) | 3005 |

We claim:

1. A non-aqueous solvent soluble dye having a central nucleus of the general structure:

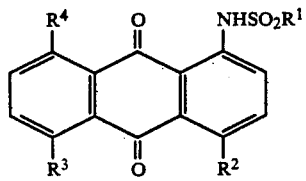

wherein $R^1$ is an alkyl group comprising two to twenty carbon atoms, and does not have a halogen substituent on the carbon alpha to the sulfur atom; $R^2$-$R^4$ may be any group other than auxochromic groups selected from the group consisting of RS—, RO—, and $R_2$N where R may be alkyl, aryl or hydrogen, and at lest one of $R^2$, $R^3$, and $R^4$ is —$NHSO_2R^1$.

2. A dye as recited in claim 1 wherein one or two of $R^2$, $R^3$, and $R^4$ is —$NHSO_2R^1$.

3. A dye as recited in claim 1 wherein $R^2$, $R^3$ and $r^4$ are —$NHSO_2R^1$.

4. A dye as recited in claim 1 wherein $R^1$ contains at least 3 carbon atoms.

5. A non-aqueous solvent soluble dye having a central nucleus of the general structure:

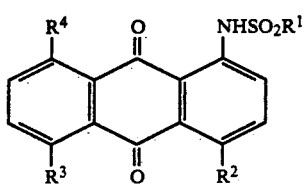

wherein $R^1$ is an alkyl group and does not have a halogen substituent on the carbon alpha to the sulfur atom; $R^2$-$R^4$ may be any group other than auxochromic groups selected from the group consisting of RS—, RO—, and $R_2$N where R may be alkyl, aryl or hydrogen, and wherein $R^1$ contains between 6 and 16 carbon atoms.

6. A non-aqueous solvent soluble dye having a central nucleus of the general structure:

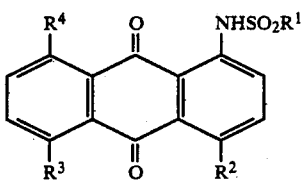

wherein $R^1$ is an alkyl group comprising two to twenty carbon atoms, and does not have a halogen substituent on the carbon alpha to the sulfur atom; $R^2$-$R^4$ may be any group other than auxochromic groups selected from the group consisting of RS—, RO—, and $R_2$N where R may be alkyl, aryl or hydrogen and wherein at least one of said $R^2$, $R^3$ and $R^4$ is —$NHCOR^9$, wherein $R^9$ is selected from the group consisting of hydrogen, alkyl group, and aryl group.

7. A non-aqueous solvent soluble dye having a central nucleus of the general structure:

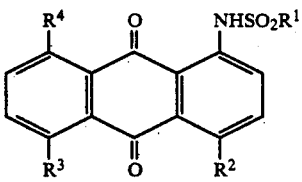

wherein $R^1$ is an alkyl group comprising two to twenty carbon atoms, and does not have a halogen substituent on the carbon alpha to the sulfur atom; $R^2$-$R^4$ may be any group other than auxochromic groups selected from the group consisting of RS—, RO—, and $R_2$N where R may be alkyl, aryl or hydrogen wherein said group $R^1$ is independently substituted with up to 6 groups $R^{10}$ selected independently from aryl, F, Cl, Br, alkoxy, aryloxy, alkythio, arylthio, amino, carbonyl, carbonylamino, sulfonyl, sulfonylamino, and cyano.

8. The dye of claim 1 wherein each said group $R^1$ is independently substituted with up to 6 groups $R^{10}$ selected independently from aryl, F, Cl, Br, alkoxy, aryloxy, alkythio, arylthio, amino, carbonyl, carbonylamino, sulfonyl, sulfonylamino, and cyano.

9. The dye of claim 2 wherein each said group $R^1$ is independently substituted with up to 6 groups $R^{10}$ selected independently from aryl, F, Cl, Br, alkoxy, aryloxy, alkythio, arylthio, amino, carbonyl, carbonylamino, sulfonyl, sulfonylamino, and cyano.

10. The dye of claim 3 wherein each said group $R^1$ is independently substituted with up to 6 groups $R^{10}$ selected independently from aryl, F, Cl, Br, alkoxy, aryloxy, alkythio, arylthio, amino, carbonyl, carbonylamino, sulfonyl, sulfonylamino, and cyano.

11. A non-aqueous solvent soluble anthraquinone dye having a central nucleus of the formula:

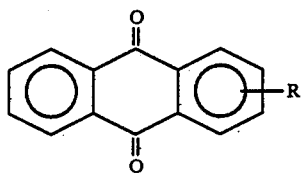

wherein R is an alkylsulfonylamino group

—NHSO$_2$R' wherein R' is an alkyl group other than methyl and halogenated methyl and wherein said central nucleus is free of auxochromic groups selected from the group consisting of R"S—, R"O—, and R"$_2$N where R" may be alkyl, aryl or hydrogen and, there are two and only two alkylsulfonamino groups present on said dye.

12. A non-aqueous solvent soluble dye having a central nucleus of the general structure:

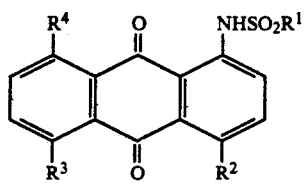

wherein $R^1$ is an alkyl group and does not have a halogen substituent on the carbon alpha to the sulfur atom; $R^2$-$R^4$ may be any group other than auxochromic groups selected from the group consisting of RS—, RO—, and R$_2$N where R may be alkyl, aryl or hydrogen, and wherein $R^1$ contains between 6 and 16 carbon atoms selected from the group consisting of:

1,8-bis(benzylsulfonylamino)anthraquinone,
1,5-bis(n-octylsulfonylamino)anthraquinone
1,4-bis(n-octylsulfonylamino)anthraquinone
1,4,5-tris(n-octylsulfonylamino)anthraquinone
1,4,5,8-tetrakis(n-octylsulfonylamino)anthraquinone,
1-(2-ethylhexanoylamio)-8-n-octylsulfonylamino-anthraquinone, and
1-n-octylsulfonylamino-8-(4'-tolylsulfonylamino) anthraquinone.

13. A dye as recited in claim 1 wherein $R^4$ is NHSO$_2$R$^1$.

* * * * *

UNITED STATES PATENT AND TRADEMARK OFFICE
CERTIFICATE OF CORRECTION

PATENT NO. : 5,034,547
DATED : July 23, 1991
INVENTOR(S) : Terrance P. Smith and Krzysztof A. Zaklika It is certified that error appears in the above-identified patent and that said Letters Patent is hereby corrected as shown below:

Column 11, line 41, "alkylsultonylamino-" should read --alkylsulfonylamino---.

Column 12, line 4, "lest" should read --least--.

Signed and Sealed this

Twenty-sixth Day of October, 1993

*Attest:*

BRUCE LEHMAN

*Attesting Officer*        *Commissioner of Patents and Trademarks*